US011475562B2

(12) United States Patent
Gerard et al.

(10) Patent No.: US 11,475,562 B2
(45) Date of Patent: Oct. 18, 2022

(54) FISSURENET: A DEEP LEARNING APPROACH FOR PULMONARY FISSURE DETECTION IN CT IMAGES

(71) Applicant: University of Iowa Research Foundation, Iowa City, IA (US)

(72) Inventors: Sarah E. Gerard, Boston, MA (US); Joseph M. Reinhardt, Iowa City, IA (US)

(73) Assignee: University of Iowa Research Foundation, Iowa City, IA (US)

(*) Notice: Subject to any disclaimer, the term of this patent is extended or adjusted under 35 U.S.C. 154(b) by 79 days.

(21) Appl. No.: 16/914,972

(22) Filed: Jun. 29, 2020

(65) Prior Publication Data

US 2020/0410670 A1    Dec. 31, 2020

Related U.S. Application Data

(60) Provisional application No. 62/867,554, filed on Jun. 27, 2019.

(51) Int. Cl.
*G06T 7/00* (2017.01)
*G06T 7/143* (2017.01)
(Continued)

(52) U.S. Cl.
CPC .......... *G06T 7/0012* (2013.01); *G06K 9/6277* (2013.01); *G06T 7/11* (2017.01);
(Continued)

(58) Field of Classification Search
CPC ........ G06T 7/0012; G06T 7/11; G06T 7/143; G06T 11/008; G06T 2207/10081;
(Continued)

(56) References Cited

U.S. PATENT DOCUMENTS

2006/0251310 A1*  11/2006  Hu .......................... G06T 7/155
                                                                382/131
2007/0133894 A1*  6/2007  Kiraly ................... G06V 10/443
                                                                382/128

(Continued)

FOREIGN PATENT DOCUMENTS

CN          111260669 A  *  6/2020

*Primary Examiner* — Van D Huynh
(74) *Attorney, Agent, or Firm* — Smith Gambrell & Russell LLP

(57) ABSTRACT

Embodiments of the present systems and methods may provide fissure detection in CT images, with improved performance, accuracy, and specificity. For example, in an embodiment, a method may comprise imaging, using a computed tomography system, at least one lung, to generate, at a computer system comprising a processor, memory accessible by the processor, and computer program instructions stored in the memory and executable by the processor, at least one computed tomography image of the at least one lung, determining, at the computer system, at least one approximate fissure region of interest in the at least one lung image, determining, at the computer system, a more precise fissure location within the at least one region of interest, and generating an image of the lung including indication of the determined fissure location.

12 Claims, 8 Drawing Sheets

(51) Int. Cl.
  *G06T 7/11* (2017.01)
  *G06T 11/00* (2006.01)
  *G06K 9/62* (2022.01)

(52) U.S. Cl.
  CPC ............ *G06T 7/143* (2017.01); *G06T 11/008* (2013.01); *G06T 2207/10081* (2013.01); *G06T 2207/20076* (2013.01); *G06T 2207/20081* (2013.01); *G06T 2207/20084* (2013.01); *G06T 2207/30061* (2013.01)

(58) Field of Classification Search
  CPC . G06T 2207/20076; G06T 2207/20081; G06T 2207/20084; G06T 2207/30061; G06K 9/6277; G06K 9/6273; G06K 2209/051
  USPC ........................................................ 382/156
  See application file for complete search history.

(56) References Cited

U.S. PATENT DOCUMENTS

| | | | |
|---|---|---|---|
| 2015/0254843 A1* | 9/2015 | Brown | G06T 7/11 382/131 |
| 2018/0085079 A1* | 3/2018 | Krimsky | A61B 6/5205 |
| 2019/0139227 A1* | 5/2019 | Wang | G06T 7/187 |
| 2019/0220701 A1* | 7/2019 | Novak | A61B 6/032 |
| 2019/0325645 A1* | 10/2019 | Guendel | G06T 11/60 |

* cited by examiner

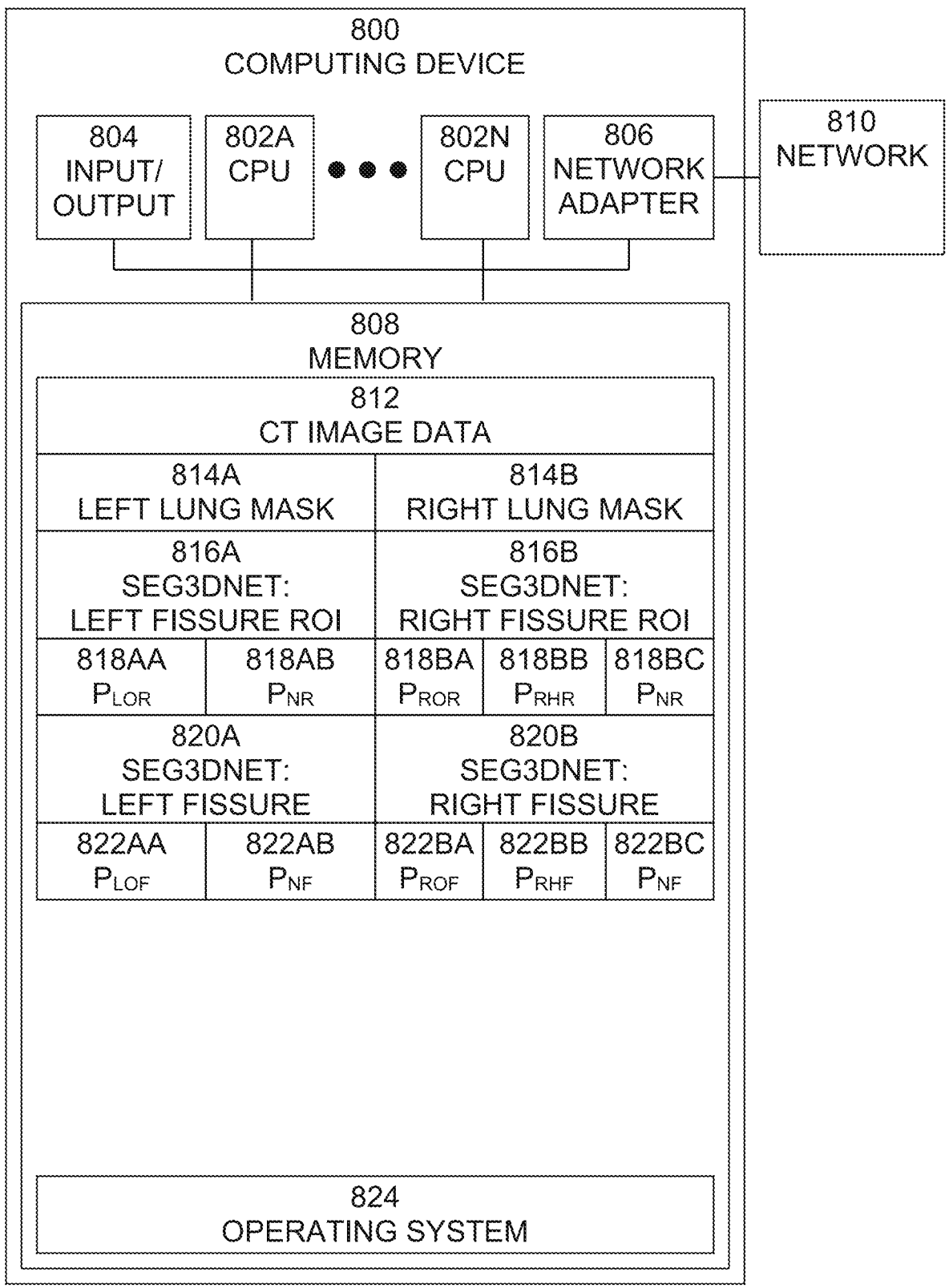

FISSURENET: A DEEP LEARNING APPROACH FOR PULMONARY FISSURE DETECTION IN CT IMAGES

CROSS-REFERENCE TO RELATED APPLICATIONS

This application claims the benefit of U.S. Provisional Application No. 62/867,554, filed Jun. 27, 2019, the contents of which are hereby incorporated by reference herein in their entirety.

BACKGROUND

The present invention relates to techniques for automatically determining locations of lung fissures in computed tomography images.

Pulmonary fissure detection in computed tomography (CT) is a critical component for automatic lobar segmentation. Many current fissure detection methods use feature descriptors that are hand-crafted, low-level, and have local spatial extent. The design of such feature detectors is typically targeted towards normal fissure anatomy, yielding low sensitivity to weak and abnormal fissures that are common in clinical datasets. Furthermore, local features commonly suffer from low specificity, as the complex textures in the lung can be indistinguishable from the fissure when global context is not considered.

Accordingly, a need arises for techniques that provide fissure detection in CT images, with improved performance, accuracy, and specificity.

SUMMARY

Embodiments of the present systems and methods may provide fissure detection in CT images, with improved performance, accuracy, and specificity Embodiments may include a supervised discriminative learning framework for simultaneous feature extraction and classification. The proposed framework, which may be called FissureNet, may be a coarse-to-fine cascade of two convolutional neural networks. The coarse-to-fine strategy may alleviate the challenges associated with training a network to segment a thin structure that represents a small fraction of the image voxels.

For example, in an embodiment, a method may comprise imaging, using a computed tomography system, at least one lung, to generate, at a computer system comprising a processor, memory accessible by the processor, and computer program instructions stored in the memory and executable by the processor, at least one computed tomography image of the at least one lung, determining, at the computer system, at least one approximate fissure region of interest in the at least one lung image, determining, at the computer system, a more precise fissure location within the at least one region of interest, and generating an image of the lung including indication of the determined fissure location.

In embodiments, the method may further comprise masking, at the computer system, the image of at least one lung based on whether the lung is a right lung or a left lung to generate a masked image of a lung. Determining an approximate fissure region of interest may comprise classifying, at the computer system, each voxel in a masked image of a right lung as being included in a right oblique fissure region of interest, being included in a right horizontal fissure region of interest, or being included in a non-fissure region of interest and classifying, at the computer system, each voxel in a masked image of a left lung as being included in a left oblique fissure region of interest, or being included in a non-fissure region of interest. Determining a more precise fissure location may comprise classifying, at the computer system, each voxel classified in the right oblique fissure region of interest as being included in the right oblique fissure or not being included in a fissure, classifying, at the computer system, each voxel classified in the right horizontal fissure region of interest as being included in the right horizontal fissure or not being included in a fissure, classifying, at the computer system, each voxel classified in the left oblique fissure region of interest as being included in the left oblique fissure or not being included in a fissure. Determining an approximate fissure region of interest may be performed using a convolutional neural network trained to detect an approximate fissure region of interest for a right lung and using a convolutional neural network trained to detect an approximate fissure region of interest for a left lung. Determining a more precise fissure location may be performed using a convolutional neural network trained to detect a more precise within the fissure region of interest for a right lung and using a convolutional neural network trained to detect a more precise within the fissure region of interest for a left lung. Each convolutional neural network may comprise a plurality of layers of learned feature detectors arranged hierarchically.

In an embodiment, a system may comprise a processor, memory accessible by the processor, and computer program instructions stored in the memory and executable by the processor to perform imaging, using a computed tomography system, at least one lung, to generate, at the computer system, at least one computed tomography image of the at least one lung, determining, at the computer system, at least one approximate fissure region of interest in the at least one lung image, determining, at the computer system, a more precise fissure location within the at least one region of interest, and generating an image of the lung including indication of the determined fissure location.

In an embodiment, a computer program product may comprise a non-transitory computer readable storage having program instructions embodied therewith, the program instructions executable by a computer system comprising a processor, memory accessible by the processor, and the program instructions stored in the memory and executable by the processor, to cause the computer to perform a method comprising imaging, using a computed tomography system, at least one lung, to generate, at a computer system, at least one computed tomography image of the at least one lung, determining, at the computer system, at least one approximate fissure region of interest in the at least one lung image, determining, at the computer system, a more precise fissure location within the at least one region of interest, and generating an image of the lung including indication of the determined fissure location.

BRIEF DESCRIPTION OF THE DRAWINGS

The details of the present invention, both as to its structure and operation, can best be understood by referring to the accompanying drawings, in which like reference numbers and designations refer to like elements.

FIG. 8 is an exemplary block diagram of a computer system, in which processes involved in the embodiments described herein may be implemented.

DETAILED DESCRIPTION

Figure 1:
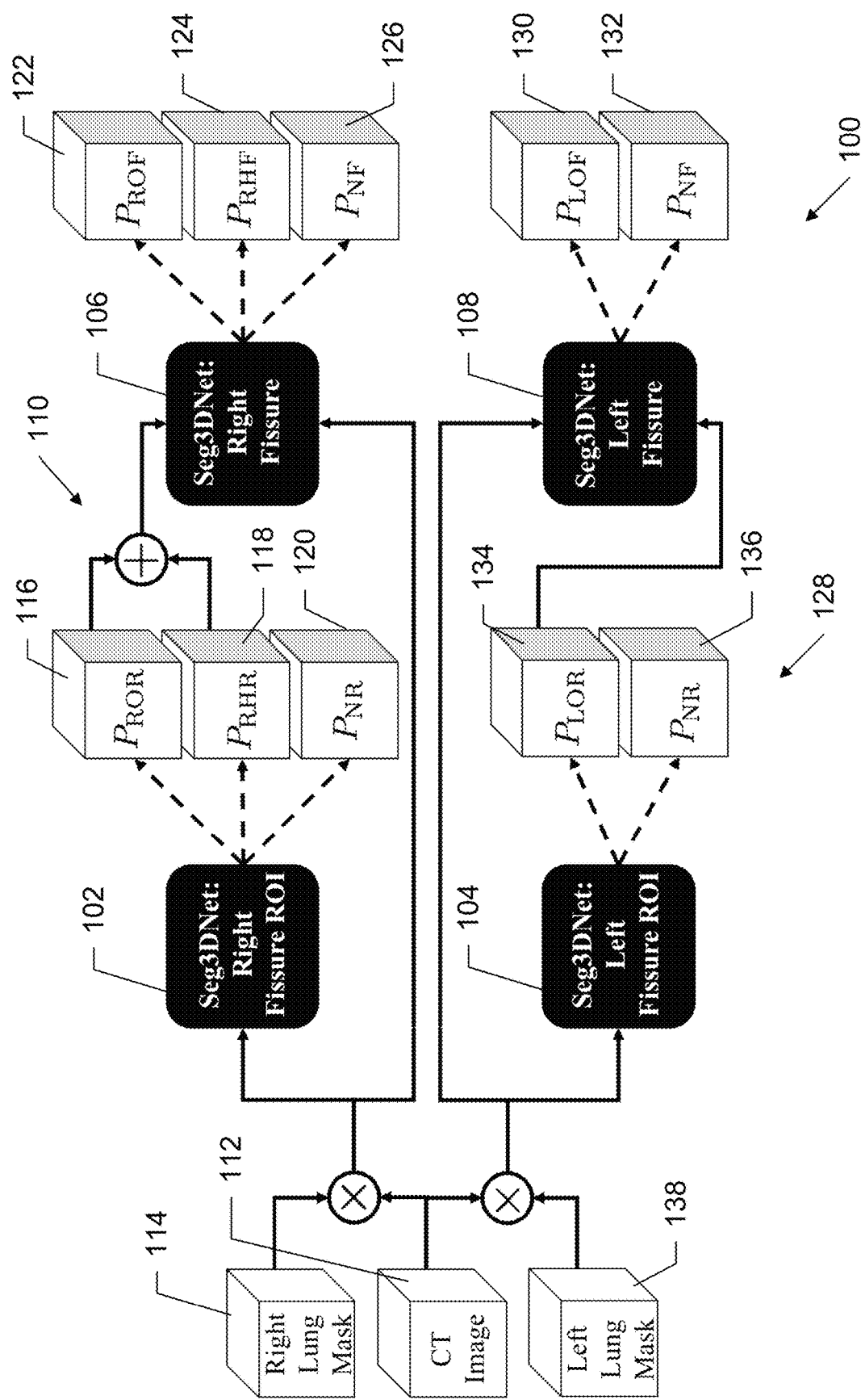
FIG. 1 illustrates an exemplary block diagram of a coarse-to-fine network cascade, according to embodiments of the present systems and methods.

Embodiments of the present systems and methods may provide fissure detection in CT images, with improved performance, accuracy, and specificity Embodiments may include a supervised discriminative learning framework for simultaneous feature extraction and classification. The proposed framework, which may be called FissureNet, may be a coarse-to-fine cascade of two convolutional neural networks. The coarse-to-fine strategy may alleviate the challenges associated with training a network to segment a thin structure that represents a small fraction of the image voxels.

Computed Tomography (CT) measures X-ray projections of the body at different angles to reconstruct a volumetric image of the anatomy. The contrast produced in a CT image reflects differences in X-ray photon attenuation, which in the lungs broadly reflects tissue density. Technological advancements in CT hardware have made it possible to scan the entire thoracic cavity in less than one second and reconstruct images with submillimeter spatial resolution. These properties make CT imaging the standard modality for imaging the intricate structures of the lung. Pulmonary CT is routinely used for diagnostics, treatment planning and delivery, and post-intervention evaluation.

CT images provide a rich source of information regarding the extent and spatial distribution of pulmonary disease. Computer-aided systems are essential for objective quantification and characterization of the complex information present in the image. Algorithms have been developed for detection and classification of nodules, texture classification of obstructive disease, pulmonary embolism detection, and quantitative airway analysis. Although CT is an anatomical imaging modality, functional information about the lung may be derived from CT scans collected at different inspiration levels using image registration.

The human lungs are composed of five lobar compartments, which are separated anatomically by three lobar fissures. The left oblique (major) fissure (LOF) separates the lower and upper lobes of the left lung. The right oblique (major) fissure (ROF) separates the lower lobe from the middle and upper lobes, and the right horizontal (minor) fissure (RHF) separates the middle and upper lobes of the right lung. It is often of clinical interest to perform quantitative analysis within each lobe individually. For example, recently identified subgroups of upper-lobe-predominant emphysema and lower-lobe-predominant emphysema had associations with clinical and imaging outcomes. Accurate knowledge of lobar anatomy is critical for successfully treating severe emphysema with bronchoscopic lung volume reduction. Lobar information also serves as a precursor to other image analysis algorithms including image registration. Currents- and varifolds-based registration algorithms rely on accurate surface representations of the lungs, lobes, and vessel trees.

The lobes are generally anatomically independent, but incomplete fissures are possible and the detection of incompleteness may be clinically relevant. An individual's unique lobar structure is likely to influence lung tissue mechanics and patterns of regional ventilation. Fissure incompleteness and the resulting collateral ventilation reduces the efficacy of endobronchial valves. Recently, it was shown that apical vs. basal emphysema distribution varies with fissure integrity. However, no relationship was found between fissure integrity and COPD severity.

Natural variability in lobar anatomy has impeded the development of robust CT analysis methods for fissure and lobar segmentation. In cross-sectional CT images the fissures appear as thin surface-like structures (less than 1 mm thick) with higher image intensity than the surrounding lung parenchyma. This makes it difficult to identify fissures in low-dose or thick-slice CT scans. Fissure segmentation in pathological lungs is further complicated by diseases that locally resemble fissures, for example, bullous lung disease and fibrosis may locally resemble fissures.

Embodiments of the present systems and methods may provide coarse-to-fine deep learning segmentation. Embodiments may achieve superior segmentation performance compared to other methods by concatenating two Seg3DNet ConvNets. The new Seg3DNet architecture is less memory-intensive compared to current techniques, enabling it to learn global contextual information from entire lung images. Seg3DNet is a generic 3D segmentation network suitable for many applications. Within embodiments, the first Seg3DNet may be trained to detect an approximate fissure region of interest (ROI) and the second Seg3DNet may be trained to detect precise fissure location within the ROI. The coarse-to-fine approach used by embodiments of the present systems and methods may overcome the challenges associated with training a network to segment a thin structure that represents a very small fraction of the total voxel count.

Embodiments of the present systems and methods may model fissure detection as a probabilistic classification problem. Given a dataset X and a finite class set Y, a probabilistic classifier may model the conditional probability distribution $P(Y|X)$. That is, given a feature vector $x \epsilon X$, the classifier may predict a probability distribution over the class set Y. The features and the conditional probability distribution may be learned jointly through end-to-end training of a Seg3DNet.

For pulmonary fissure classification the class set Y may consist of the three fissures and a non-fissure class, such that all voxels that are not fissure may be assigned to the non-fissure class. The number of fissure voxels may be very small compared to the number of non-fissure voxels; there may be approximately one fissure voxel for every 100 non-fissure voxels within the lung mask (at the typical image resolutions). Embodiments may use a coarse-to-fine approach by cascading two Seg3DNets, as shown in FIG. 1. The first Seg3DNet may be trained to detect an approximate fissure region of interest (ROI) and the second Seg3DNet may be trained to detect the precise fissure location within the ROI. Separate pipelines may be trained for the left and right lungs, yielding four total Seg3DNet classifiers: left fissure ROI, right fissure ROI, left fissure, and right fissure.

An exemplary block diagram of a coarse-to-fine network cascade 100, according to embodiments of the present systems and methods, is shown in FIG. 1. Black boxes 102, 104, 106, 108 represent four Seg3DNet classifiers, each trained for a different classification task. For the right lung pipeline 110 (top), the CT image 112 may be masked with the right lung mask 114 and input to the right fissure ROI Seg3DNet 102. The output of ROI Seg3DNet 102 may represent the probability that each voxel is right oblique fissure ROI ($P_{ROR}$) 116, right horizontal fissure ROI ($P_{RHR}$) 118, and non-fissure ROI ($P_{NR}$) 120. The input to the right fissure Seg3DNet 106 may be the masked CT image 112 and the probability maps $P_{ROR}$ 116 or $P_{RHR}$ 118. The output of the right fissure Seg3DNet 106 gives the probability that each voxel is right oblique fissure ($P_{ROF}$) 122, right horizontal fissure ($P_{RHF}$) 124, and non-fissure ($P_{NF}$) 126. The left lung pipeline 128 (bottom) is similar, except each classifier only predicts two classes corresponding to left oblique fissure 130 and non-fissure 132.

CONVOLUTIONAL NEURAL NETWORK. A Convolutional Neural Network (ConvNet) is a specialized neural network model designed to exploit patterns in spatially correlated data, such as images and videos. At a high level, a ConvNet may have multiple layers of learned feature detectors arranged hierarchically. The feature detectors in each layer are local, however, the composition of layers allows the spatial extent defined on the input image, called receptive field, to grow with layer depth. This design gives the network the capacity to learn global features, without the computational overhead and increased number of parameters required for large feature detectors. The feature detectors may be shared spatially, making a given feature relevant at any location in the image. Layers with feature detectors are called convolutional layers. The feature detectors, or kernels, are not explicitly encoded but are the parameters being learned through optimization. Convolutional layers are typically followed by an elementwise nonlinearity and interleaved with pooling layers which serve to reduce the spatial resolution.

Each layer in a ConvNet may take a feature representation as input, perform an operation to transform the input, and produce a new feature representation as the output. The layers may be arranged hierarchically: the output feature representation of one layer may serve as the input to the following layer. Each feature representation may consist of a set of spatial activation maps, each representing a different feature type. The activation maps may be concatenated along a non-spatial dimension, such as the channel dimension, to form the feature representation. Therefore, in a 3D ConvNet, the intermediate feature representations may all be 4D images. The channel dimension is analogous to that of an RGB image, for example, the voxels may be vector-valued and each vector element may represent a different feature type.

The ConvNet parameters (feature detectors) may be learned from labeled training data using backpropagation. Starting with randomly initialized parameters, a training example may be propagated through the network and a prediction may be made. The dissimilarity between the prediction and the true label may be quantified with a loss function. The gradient on the loss with respect to each parameter may be calculated using backpropagation, which is a recursive application of the chain rule. All parameters may be updated to decrease the error using, for example, stochastic gradient descent, or some variant thereof.

Figure 2:
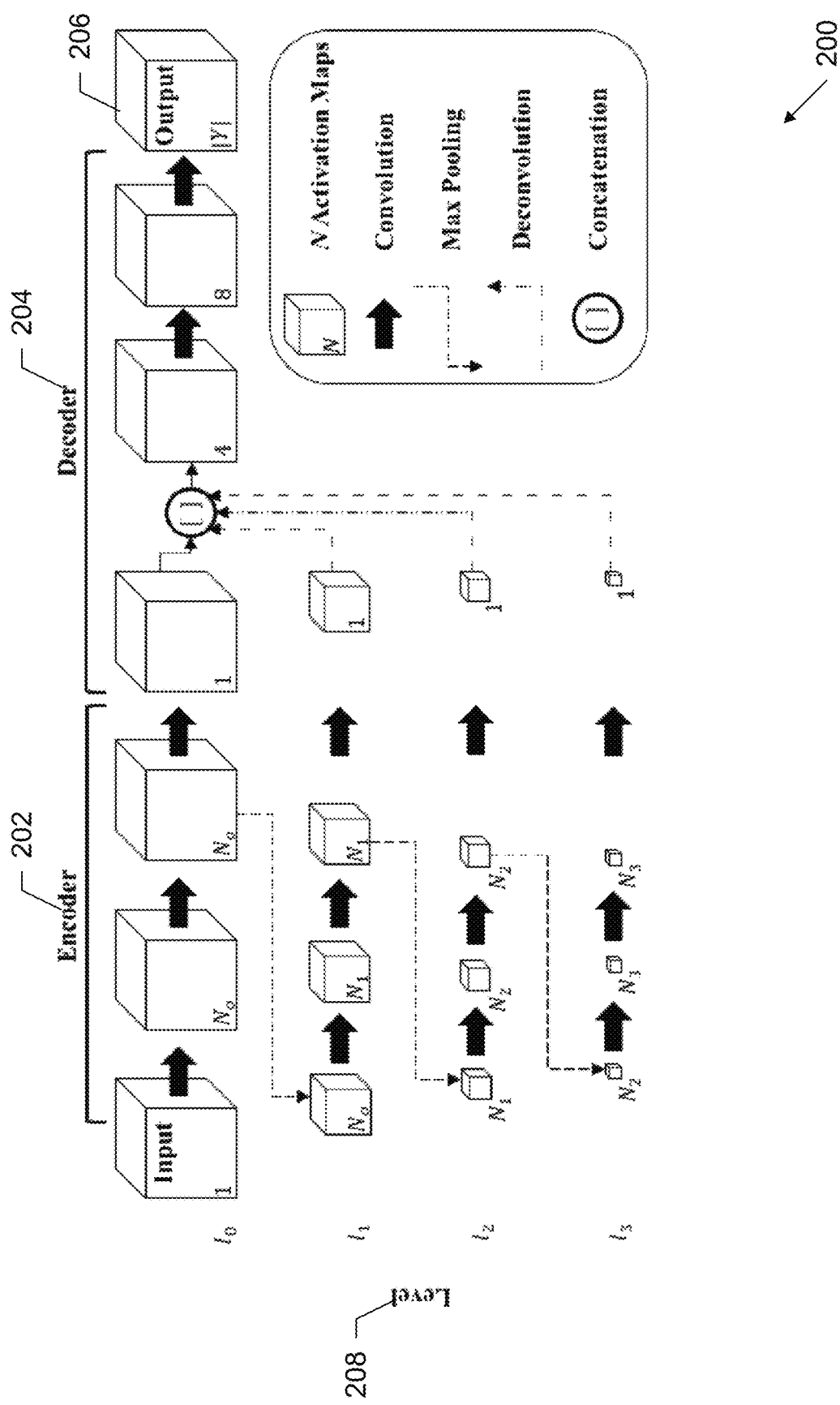
FIG. 2 is an exemplary block diagram a 3D convolutional neural network architecture, according to embodiments of the present systems and methods.

Seg3DNet. Embodiments of the present systems and methods may utilize a 3D ConvNet architecture for image segmentation, such as Seg3DNet 200, shown in FIG. 2. As shown in FIG. 2, each arrow represents an operation performed by a layer and each cube represents the intermediate feature representations produced by a layer. For visualization purposes, only the spatial dimensions of the feature representations are illustrated. The number of activation maps (size of channel dimension) is denoted in the lower left corner. For the encoder module, define $N_i=2^{i+5}$ so that the number of activation maps increases by a factor of two at each level. The number of kernels used in each convolutional layer may be inferred by the number of activation maps in the layer's output representation, for example, the first convolutional layer has $N_0=2^{0+5}=32$ kernels. The relative spatial size of the activation maps are drawn to scale. At each level the feature representation may be spatially downsampled by a factor of two. Batch normalization and ReLU nonlinearity may be performed after each convolution except the last.

Seg3DNet may include an encoder 202 that generates a high dimensional feature representation of the image, and a decoder 204 that decodes the features to produce a segmentation output 206. Unlike many segmentation architectures, the encoder 202 and decoder 204 modules in Seg3DNet 200 may be asymmetrical. The encoder 202 module may consist of L resolution levels 208 $l_i$ for $i=0, 1, \ldots, L-1$, where the activation maps in level $l_i$ are downsampled by a factor of $2^i$ relative to the full resolution level $l_0$. Each level of the encoder may have two convolutional layers followed by a max-pooling layer. All convolutional layers may use $3\times3\times3$ voxel kernels, and the number of kernels in level $l_i$ may be given by $N_i=2^{i+5}$. After the second convolution layer of each level, max pooling with kernel size $2\times2\times2$ and stride of 2 produces the downsampling factor of 2 between levels. While recent ConvNet architectures have eliminated pooling layers, downsampling may achieve a global receptive field on large input volumes. To mitigate the loss of precise localization information from the pooling layers, the decoder network may combine representations from all scale levels.

The decoder module condenses the representation at each scale level to a single activation map using a convolutional layer with a single voxel kernel of size $1\times1\times1\times N_i$. The lower resolution activation maps may be upsampled to full resolution using nearest neighbor interpolation followed by a convolution with filter size $2^i+1$, effectively performing a variant of deconvolution. The resulting activation maps, one from each scale level, may be concatenated along the feature dimension to form a multi-scale representation. Two more convolutional layers are used to combine information from different scales.

The representation at the last layer of the Seg3DNet has |Y| activation maps each with the same spatial dimensions as the input volume. The output at spatial location x of activation map y, $f_y(x)$, is interpreted as an unnormalized log probability of x belonging to class y. The softmax vector nonlinearity may be used to obtain the conditional probability distribution, given by:

$$P(Y = y | x) = \frac{e^{f_y(x)}}{\sum_{j \in Y} e^{f_j(x)}}. \quad (1)$$

The probability for each class $y \in Y$ may be denoted as $P_y(x)$. By construction, Y is a valid probability distribution function with $P_y(x) \in [0,1]$ $\forall y \in Y$, and $$\sum_{y \in Y} P_y(x) = 1.$$

For the right lung ConvNets, define separate classes to distinguish between oblique and horizontal fissures. Therefore, the class set cardinality for the left and right lung ConvNets is |Y|=2 and |Y|=3, respectively.

Batch normalization and ReLU nonlinearities may be used after each convolution layer with the exception of the last layer. All convolutional layers use zero-padding to prevent reduction in spatial dimensions.

FissureNet. As shown in FIG. 1, Embodiments of the present systems and methods may have two parallel pipelines 110, 128, each of which is a coarse-to-fine cascade of two Seg3DNets. The first Seg3DNet 110 may be trained to detect a fissure ROI. The original ground truth fissure segmentations may be modified to produce the fissure ROI training labels. A voxel belongs to the fissure ROI if it is located within 5 mm of the corresponding fissure, otherwise it is non-fissure. This dilation of the single-voxel ground truth may reduce the class skewness. Additionally, by dilating the ground truth fissure, the network may be able to focus on global patterns rather than precise fissure appearance. As a result, the network may be more robust to weak and radiographically incomplete fissures. The fissure ROI allows for small imperfections in the training data which are expected due to the nature of manually tracing a single voxel curve.

For training the first Seg3DNet 102, 104, define the loss associated with each voxel using categorical cross entropy of the form $$L(x, Y) = -\sum_{y \in Y} t_y(x) \log P_y(x), \quad (2)$$

where $t_y(x)$ represents a one-hot encoding of the target label for voxel x and class y, such as, $t_y(x)$ is one when y corresponds to the true class and zero for all other classes.

The total loss for an input image may be given by $$L_{ROI} = \frac{\sum_{x \in \Omega} L(x, Y_{ROI})}{|\Omega|} \quad (3)$$

where $\Omega$ is the input image domain and $Y_{ROI}$ is ROI classifier class set.

The second Seg3DNet 106, 108 may be trained to detect the precise fissure location. The original ground truth fissure segmentations may be used as training labels. The loss associated with each voxel is the same as the first Seg3DNet. However, the total loss may be a weighted average using the probability that the voxel is in a fissure ROI $$L_F = \frac{\sum_{x \in \Omega} (1 - P_{NR}(x)) L(x, Y_F)}{\sum_{x \in \Omega} (1 - P_{NR}(x))} \quad (4)$$

where $P_{NR}(x)$ is the probability that voxel x is non-fissure ROI as predicted by the first Seg3DNet 102, 104 and $Y_F$ is the fissure classifier class set. This weighting limits the contribution of the large number of non-fissure voxels to the loss function, mitigating the class imbalance problem while allowing for precise fissure localization.

Implementation. Embodiments may be implemented, for example, using the open source frameworks Theano and Lasagne. In this example, training was performed using a P40 NVIDIA GPU with 24 GB of RAM. Adam optimization was used with an initial learning rate of $5 \times 10^{-4}$. All parameters were initialized using Xavier normal initialization. Each network was trained for six epochs, which took approximately 48 hours. Inference time with the trained network is 10 seconds per lung on a consumer grade GPU card.

Experimental Methods. Datasets and Preprocessing. Exemplary experiments were performed using embodiments of the present systems and methods. In these experiments, training and testing data were acquired from the COPDGene study, a large multi-center clinical trial with over 10,000 subjects with chronic obstructive pulmonary disease (COPD). COPD, which includes emphysema and chronic bronchitis, is characterized by airway inflammation and large regions of trapped gas on CT.

The COPDGene image datasets were acquired across 21 imaging centers using a variety of scanner makes and models. Each patient had two breath-hold 3D CT scans acquired, one at total lung capacity (TLC) with a dose of 200 mAs and one at functional residual capacity (FRC) with a dose of 50 mAs. Original slice thicknesses ranged from 0.625 mm to 0.9 mm. See regan2011 for the complete image acquisition protocol.

A subset of 1601 subjects was selected for training and a separate disjoint subset of 3706 subjects was selected for testing. The TLC scan and FRC scan for each subject were utilized, producing a training dataset with 3202 scans and a testing dataset with 7412 scans. All COPD GOLD levels were used for training and evaluation, as shown in Table 1, for distribution of disease severity in training and testing datasets. Each subject in COPDGene has a unique identifier consisting of five numbers and one letter, e.g., 10005Q. Subjects with identifiers that begin with values in the range 10-12 were included in the training dataset and subjects with identifiers that begin with values in the range 13-19 were included in the testing dataset.

TABLE 1

|  | Training | Testing |
| --- | --- | --- |
| GOLD0 | 583 | 1625 |
| GOLD1 | 133 | 309 |
| GOLD2 | 350 | 617 |
| GOLD3 | 235 | 360 |
| GOLD4 | 135 | 186 |
| No PFT | 28 | 53 |
| Non-Smoker | 0 | 90 |
| PRISm | 137 | 466 |
| Total | 1601 | 3706 |

Table 1 shows disease stratification for the training and testing datasets.

An additional dataset of 20 4-dimensional computed tomography (4DCT) scans from a lung cancer clinical trial were used were used for evaluation. The 4DCT scans were acquired on a Siemens EDGE CT scanner with parameters of 120 kV tube voltage, 100 mAs tube current, 0.5 second tube rotation period, 0.09 pitch, 76.8 mm beam collimation, 128 detector rows, and a reconstructed slice thickness of 0.6 mm. The 4DCT scans were acquired with audio guidance.

The image data was retrospectively sorted and reconstructed into ten phase images. A single phase from each subject was selected for fissure evaluation, the selected phases were chosen to represent an assorted range of tidal volumes and phases. There were no scans of this type included in the training dataset.

Due to memory constraints on the GPU, all images were resampled to isotropic 1 mm³ voxels. For each lung, sub-volumes of size 64×200×200 voxels were extracted for training. For the majority of subjects, this crop size covers the entire sagittal view of the lung, however, it may not cover all sagittal slices. Therefore, for training three sub-volumes were extracted centered at different sagittal slices to ensure the entire lung was covered.

For preprocessing, CT intensity values were clamped to the range of interest for fissure detection (i.e. −1024 HU and −200 HU) which also removes outliers caused by calcification and metal artifacts. Voxels outside of the lung mask were set to −1024 HU. After clamping and masking, the CT image intensities were linearly rescaled according to $$I'(x) = \frac{I(x) - \mu_{HU}}{\sigma_{HU}},$$

where $\mu_{HU}$ and $\sigma_{HU}$ are the mean and standard deviation of HU values calculated over the entire training dataset and I(x) and I(x) are the original HU values and rescaled image intensities, respectively, for a given voxel x.

Ground Truth. Lung and lobar segmentations in the COPDGene study were obtained using a commercial software package (Apollo, VIDA Diagnostics, Coralville, Iowa), followed by manual inspection and editing as needed. The Apollo software calculates a fissure probability measure using local fissure appearance and anatomical information from the airways and vasculature and then uses surface fitting to interpolate and extrapolate a complete fissure. The manual correction was performed by trained analysts (professional research assistants) with experience levels ranging from 0-4 years. Corrections were supervised by an experienced radiologist. Manual analysts were instructed to interpolate and extrapolate when necessary to completely divide the lung into five lobes. Fissure segmentations were extracted automatically from the lobar segmentations by identifying adjacent voxels with different lobe labels, producing a two-voxel thin fissure segmentation.

Fissure segmentations for the lung cancer 4DCT dataset were defined manually by an experienced medical physics PhD student using MimVista 6.4.7 software (MIM Software, Cleveland, Ohio). For this dataset, both complete fissures (forming full lobar boundaries) and visible fissures were identified. The visible fissures were first identified and subsequently interpolated and extrapolated to separate lobes when necessary.

Evaluation Metrics. Receiver operating characteristic (ROC) curves are commonly used to evaluate the performance of a binary classifier by measuring the tradeoff between true positive rate (TPR) and false positive rate (FPR) at different thresholds. Similarly, precision-recall (PR) curves measure the tradeoff between precision and recall (recall is the same as TPR). Recent studies have demonstrated that PR curves are better at evaluating and comparing binary classifiers in problems with a skewed prior class probability. In such cases, ROC curves tend to be overly optimistic and do not distinguish between methods with different false positive behavior. The prior probability of fissure voxels is very small, so PR may be reported results to better discriminate between methods.

For PR evaluation, a 3 mm margin was used. Briefly, for calculating precision, predicted fissure voxels are categorized as true positive (TP) or false positive (FP): TP if the voxel is within 3 mm of the ground truth fissure or otherwise FP. Likewise, for calculating recall, ground truth fissure voxels are categorized as TP or false negative (FN): TP if the voxel is within 3 mm of the predicted fissure or otherwise FN. The 3 mm margin accounts for the subjectivity in manual delineation of a thin structure with low contrast. All voxels within the lung mask are considered for PR calculation and the ground truth is a two-voxel thin fissure. The PR curve was reported along with the area under the PR curve (PR-AUC). The optimal operating point on a PR curve is the upper right corner, and PR-AUC has values ranging from 0 to 1, with 1 describing a perfect classifier.

The surface distance between predicted fissure and nearest ground truth fissure was evaluated. For this analysis, hard fissure predictions were obtained by thresholding the probability output. The optimal threshold was determined separately for each method and was defined as the threshold on the PR curve where precision is equal to recall using a dataset of 20 COPDGene subjects (using both TLC and FRC scans) that were not included in the training or testing datasets. For each scan the average surface distance (ASD) and standard deviation of surface distances (SDSD) was calculated.

Results. Embodiments of the present systems and methods utilized in the experiments were compared against three other fissure detection methods: the Hessian-based method, the DoS method, and the U-Net method. The Hessian and the DoS methods do not distinguish between the right oblique and horizontal fissures. Therefore, only an aggregated right fissure (RF) measure is made for the right lung. For comparison, the RF measure is evaluated on embodiments of the present systems and methods and U-Net by adding the ROF and RHF probabilities.

Figure 3:
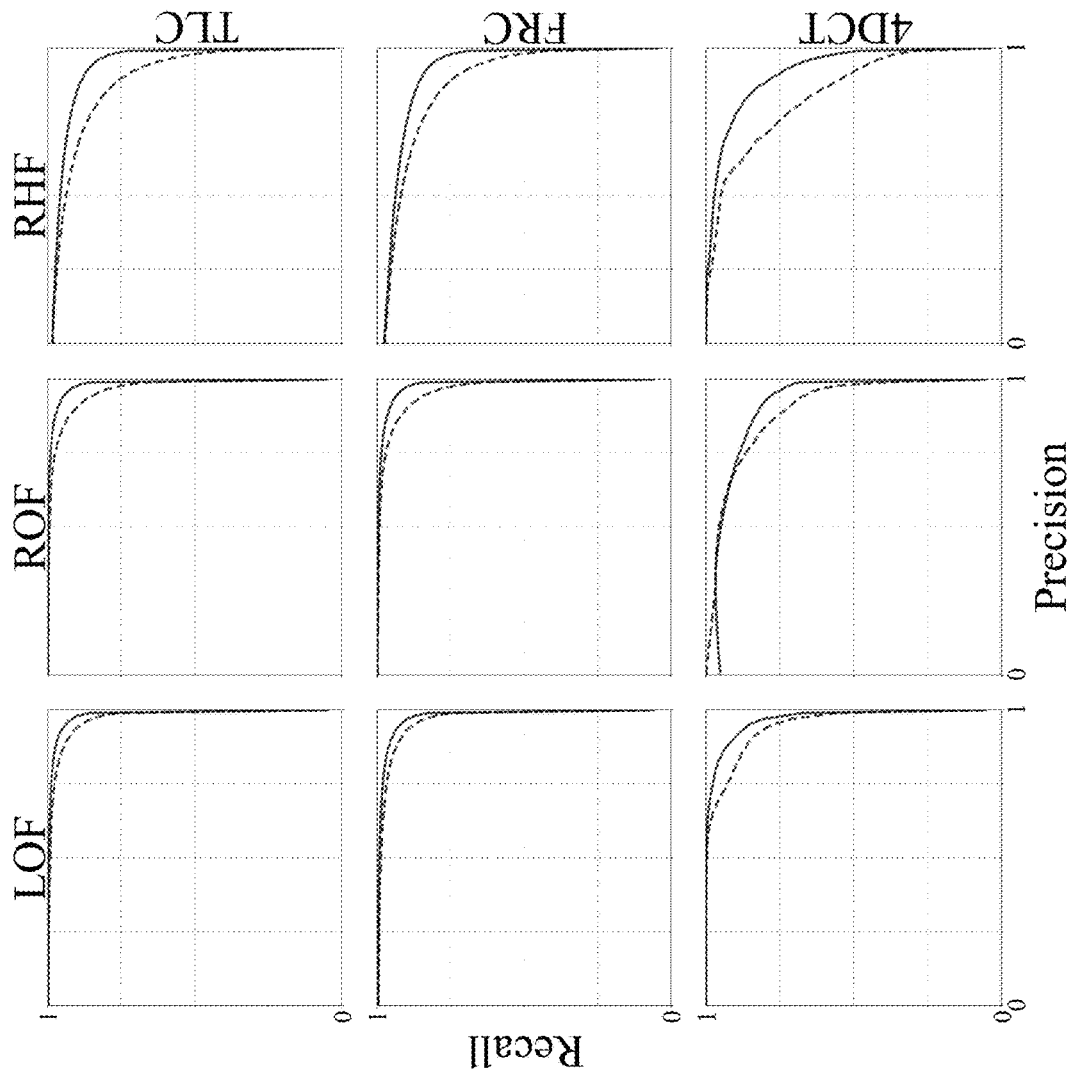
FIG. 3 illustrates exemplary results of experiments performed using embodiments of the present systems and methods.

FIG. 3 compares PR curves for embodiments of the present systems and methods and U-Net methods on 3706 subjects (TLC and FRC scans for each subject) from COPDGene and 20 lung cancer subjects with 4DCT scans. PR-AUCs for FissureNet, U-Net, and Hessian are displayed in Tables 2 and 3 for the COPDGene and lung cancer datasets, respectively. Overall, PR-AUC for FissureNet, U-Net, and Hessian methods were 0.980, 0.963, and 0.158, respectively, on the COPDGene dataset and 0.966, 0.937, and 0.182, respectively, on the lung cancer dataset. All methods had similar performance on the COPDGene and the lung cancer datasets and FissureNet performed best with regards to PR-AUC. Table 4 shows PR-AUCs on the lung cancer dataset using a ground truth which only indicates radiographically visible fissures. FissureNet and U-Net performed slightly better using the visible-only ground truth, while Hessian performed slightly worse. Table 5 shows PR-AUCs for FissureNet and DoS evaluated on a subset of 15 subjects (30 scans). The post-processing in the DoS method greatly improves the PR-AUC from 0.177 (DoS1) to 0.668 (DoS2), however, FissureNet consistently performed better than DoS2 without any post-processing with an overall PR-AUC of 0.991. In Tables 2-5 only LOF and RF fissures are included in mean calculation to avoid overweighting right lung results.

TABLE 2

| | | PR-AUC | | |
|---|---|---|---|---|
| Phase | Fissure | Hessian | U-Net | FissureNet |
| TLC | LOF | 0.145 | 0.973 | 0.985 |
| | RF | 0.216 | 0.959 | 0.982 |
| | ROF | — | 0.967 | 0.987 |
| | RHF | — | 0.891 | 0.939 |
| FRC | LOF | 0.108 | 0.968 | 0.979 |
| | RF | 0.165 | 0.952 | 0.975 |
| | ROF | — | 0.964 | 0.983 |
| | RHF | — | 0.878 | 0.919 |
| Mean | | 0.158 | 0.963 | 0.980 |

Table 2 shows PR-AUC for 3706 subject (7412 scan) testing dataset from COPDGene.

TABLE 3

| | PR-AUC | | |
|---|---|---|---|
| Fissure | Hessian | Unet | FissureNet |
| LOF | 0.171 | 0.950 | 0.972 |
| RF | 0.193 | 0.924 | 0.961 |
| ROF | — | 0.899 | 0.916 |
| RHF | — | 0.848 | 0.926 |
| Mean | 0.182 | 0.937 | 0.966 |

Table 3 shows PR-AUC for 20 lung cancer subjects with 4DCT scans. Non-visible fissures were interpolated and extrapolated to form complete boundaries between lobes.

TABLE 4

| | PR-AUC | | |
|---|---|---|---|
| Fissure | Hessian | Unet | FissureNet |
| LOF | 0.113 | 0.978 | 0.992 |
| RF | 0.137 | 0.985 | 0.988 |
| ROF | — | 0.965 | 0.953 |
| RHF | — | 0.917 | 0.946 |
| Mean | 0.125 | 0.982 | 0.990 |

Table 4 shows PR-AUC for 20 lung cancer subjects with 4DCT scans. Only visible fissures were marked in the ground truth.

TABLE 5

| | | PR-AUC | | |
|---|---|---|---|---|
| Phase | Fissure | DoS1 | DoS2 | FissureNet |
| TLC | LOF | 0.167 | 0.706 | 0.993 |
| | RF | 0.155 | 0.652 | 0.992 |
| | ROF | — | — | 0.995 |
| | RHF | — | — | 0.968 |
| FRC | LOF | 0.191 | 0.704 | 0.987 |
| | RF | 0.196 | 0.610 | 0.990 |
| | ROF | — | — | 0.994 |
| | RHF | — | — | 0.967 |
| Mean | | 0.177 | 0.668 | 0.991 |

Table 5 shows PR-AUC for 15 subject (30 scan) testing subset from COPDGene.

TABLE 6

| | | ASD | | SDSD | |
|---|---|---|---|---|---|
| Dataset | Fissure | U-Net | FissureNet | U-Net | FissureNet |
| TLC | LOF | 3.75 | 0.65 | 10.56 | 2.14 |
| | ROF | 4.83 | 0.57 | 12.78 | 2.06 |
| | RHF | 7.23 | 2.39 | 13.64 | 5.49 |
| FRC | LOF | 2.32 | 0.66 | 6.93 | 1.66 |
| | ROF | 4.03 | 0.53 | 10.38 | 1.43 |
| | RHF | 5.57 | 1.96 | 9.79 | 3.85 |
| 4DCT | LOF | 2.97 | 0.62 | 9.06 | 1.36 |
| | ROF | 6.50 | 1.97 | 13.86 | 2.88 |
| | RHF | 9.31 | 1.90 | 15.27 | 4.93 |

Figure 4:
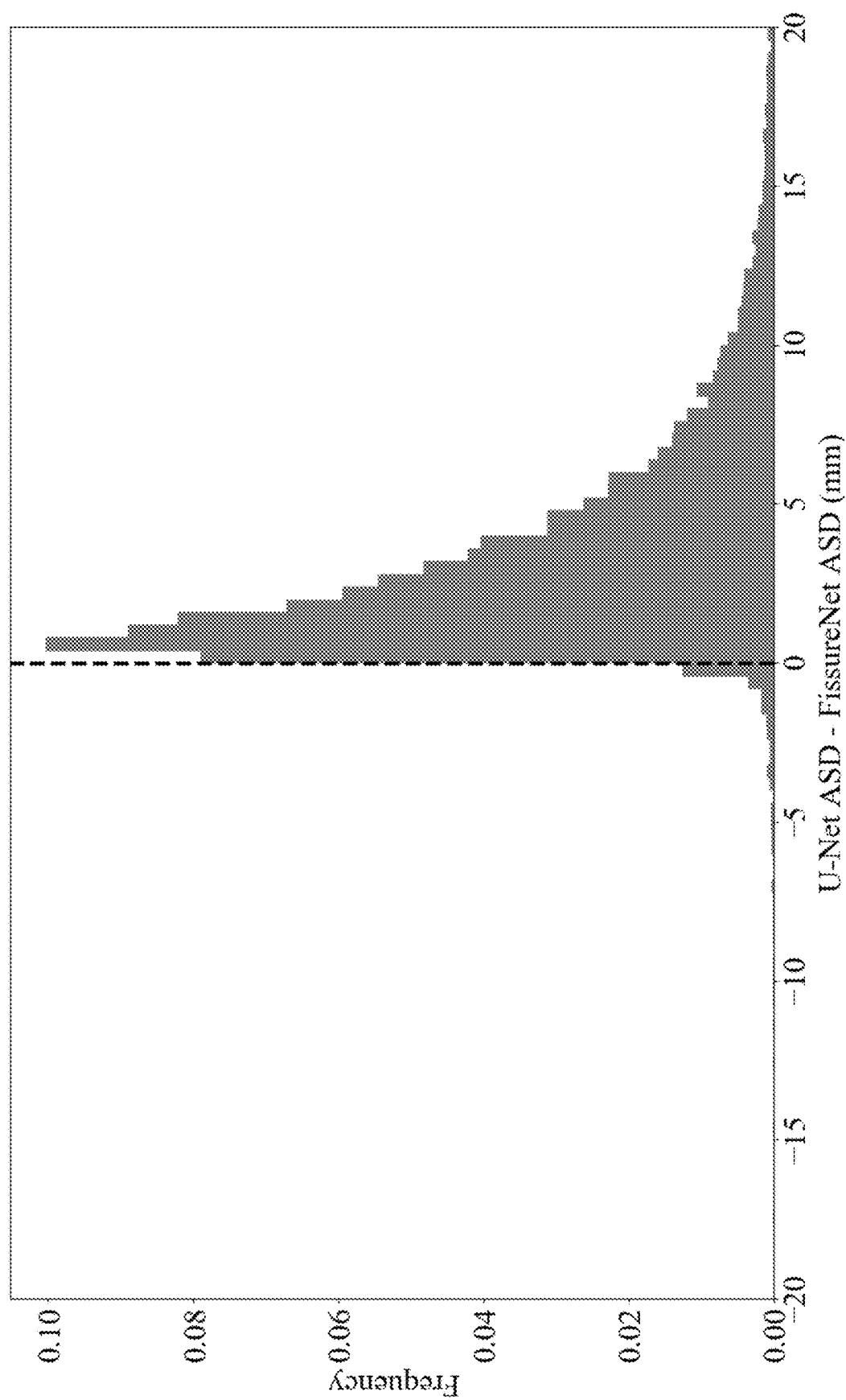
FIG. 4 illustrates exemplary results of experiments performed using embodiments of the present systems and methods.

Table 6 shows ASD and SDSD averaged over all subjects. in particular, table 6 shows average surface distance (ASD) and standard deviation of surface distances (SDSD) averaged over 3706 subject COPDGene testing dataset (TLC and FRC) and lung cancer testing dataset (4DCT). distances reported in mm. On average, the ASD for FissureNet was less than U-Net for all scan types and fissures. FIG. 4 shows a histogram of the differences in ASD between U-Net and embodiments of the present systems and methods on a subject-by-subject basis; 97% of the histogram area is to the right of the vertical line corresponding to cases where FissureNet has a lower ASD compared to U-Net.

Statistical testing was performed to test for significant differences in performance between methods with regards to evaluation metrics. Paired t-tests showed that embodiments of the present systems and methods had a significantly greater PR-AUC and a significantly lower ASD compared to U-Net on both the COPDGene and lung cancer datasets (p<0.001). Additionally, embodiments of the present systems and methods had a significantly greater PR-AUC compared to Hessian on both the COPDGene and lung cancer datasets (p<0.001).

Figure 5:
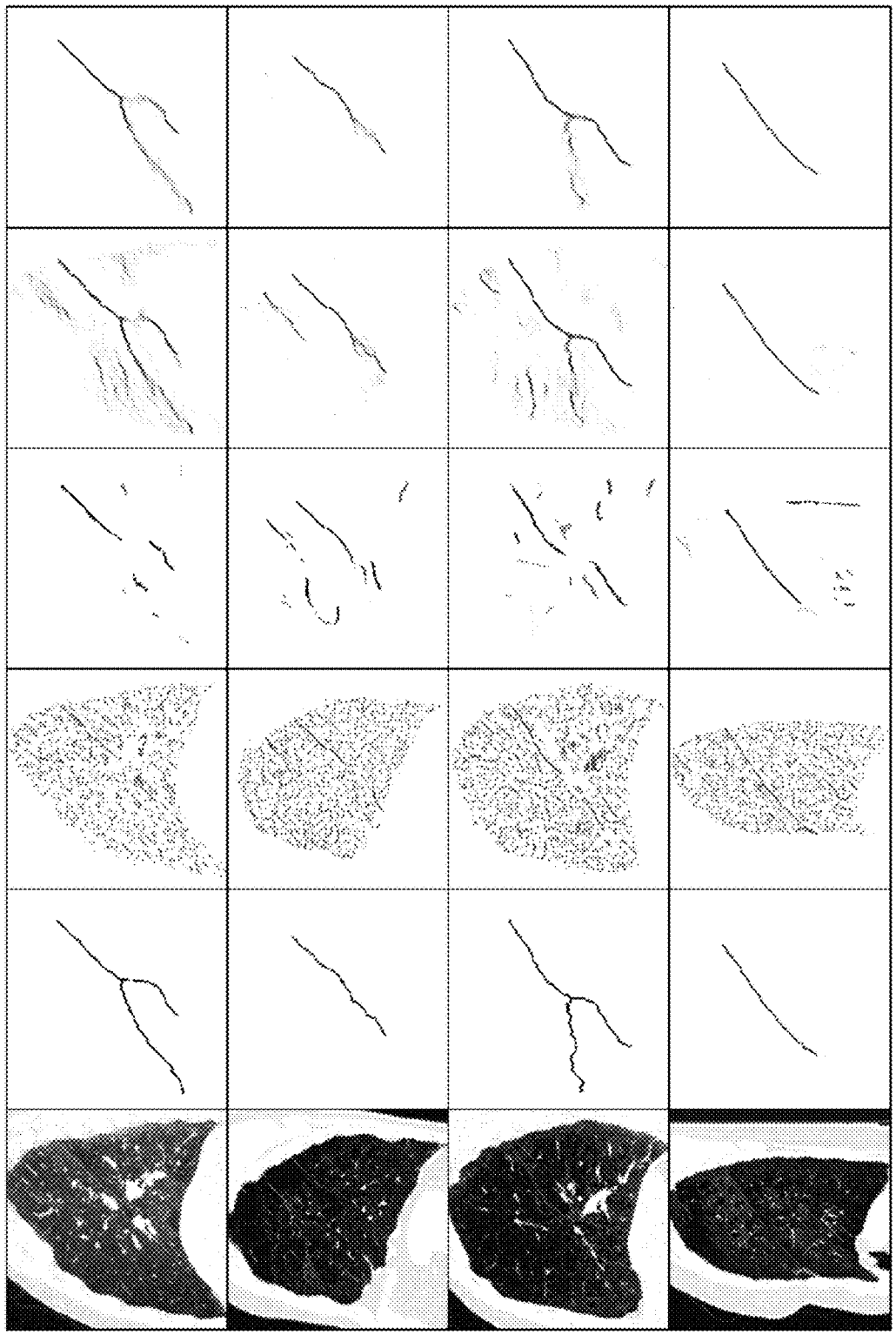
FIG. 5 illustrates exemplary results of experiments performed using embodiments of the present systems and methods.
Figure 6:
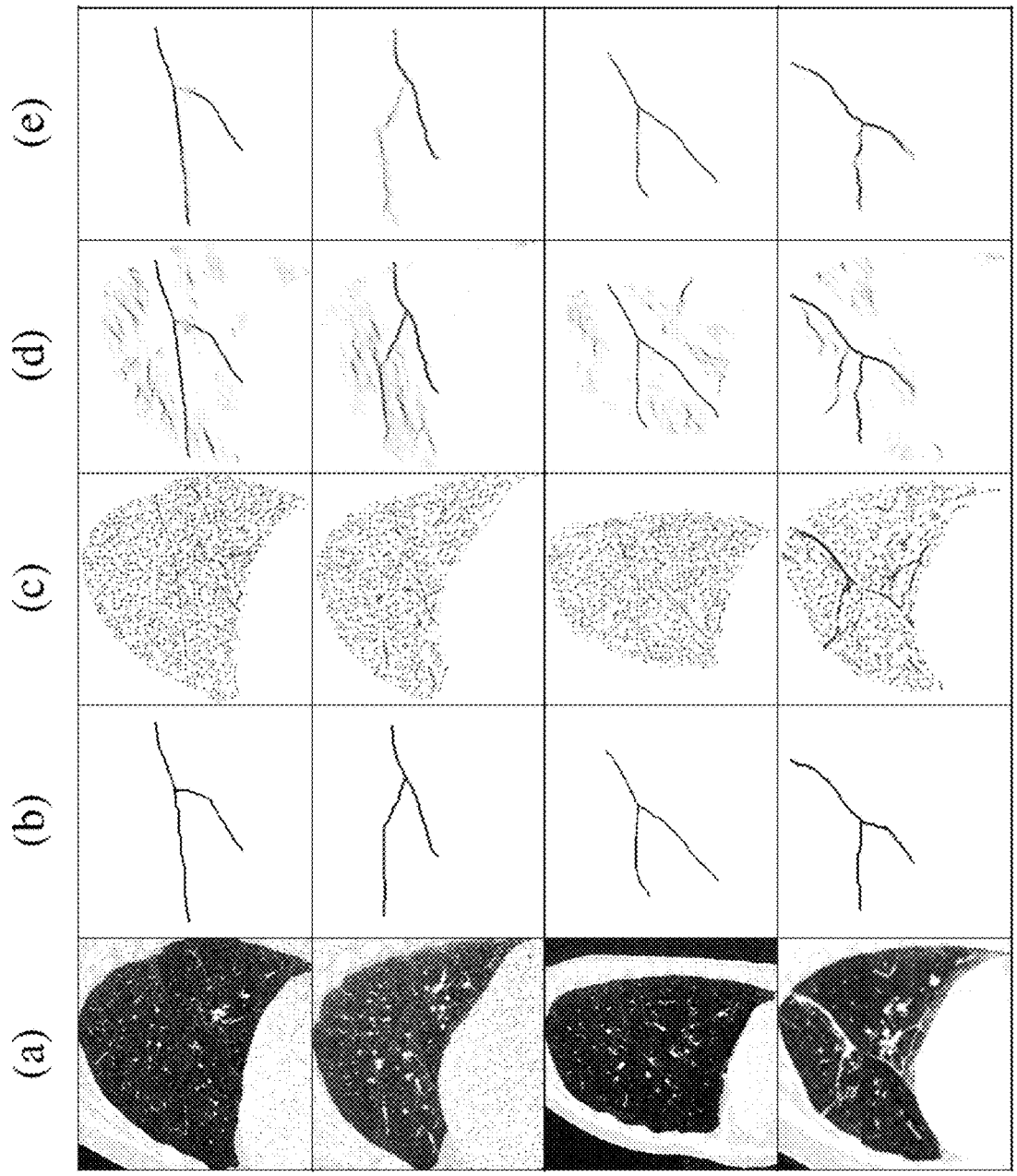
FIG. 6 illustrates exemplary results of experiments performed using embodiments of the present systems and methods.

Representative fissure detection results are displayed in FIG. 5 for the COPDGene dataset and FIG. 6 for the lung cancer dataset. In particular, FIG. 5 shows representative results for four COPDGene subjects in rows one to four, GOLD1 FRC, GOLD3 TLC, GOLD3 FRC, GOLD4 TLC. The columns show (a) CT sagittal slice, (b) ground truth, (c) Hessian, (d) DoS2, (e) U-Net, (f) embodiments of the present systems and methods. DoS2 greatly reduces the number of false positives compared to Hessian, however, for these cases it fails to detect the horizontal fissure (rows 1 and 3). Embodiments of the present systems and methods and U-Net have results that are similar with high sensitivity and few false positives, however, embodiments of the present systems and methods have fewer false positives.

FIG. 6 shows representative results for four lung cancer subjects in rows one to four, GOLD1 FRC, GOLD3 TLC, GOLD3 FRC, GOLD4 TLC. The columns show (a) CT sagittal slice, (b) ground truth, (c) Hessian, (d) U-Net, (e) embodiments of the present systems and methods. Row 4 has a dense pathology superior to the horizontal fissure that is falsely detected by Hessian and U-Net; however, embodiments of the present systems and methods correctly classify this as non-fissure.

Figure 7:
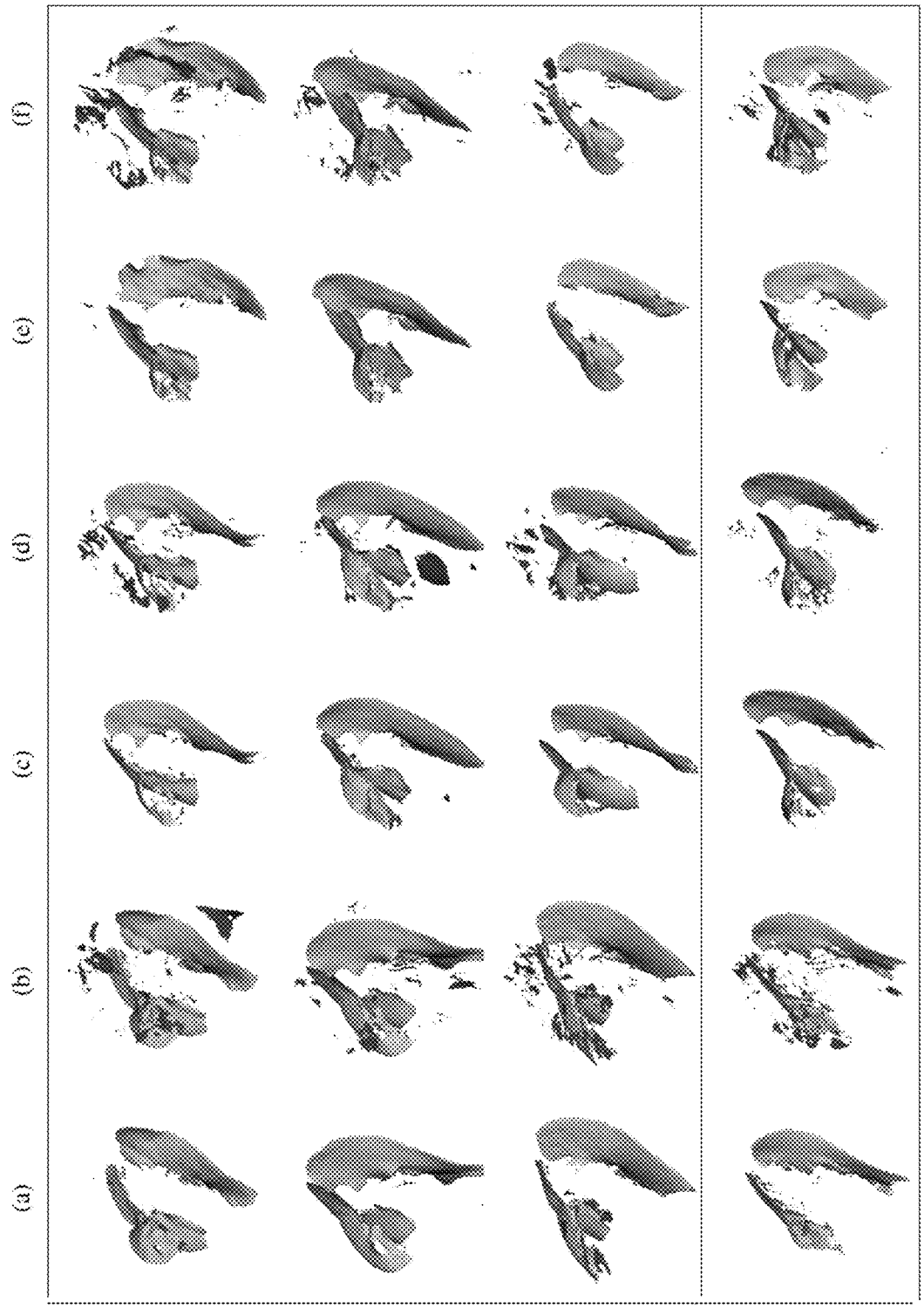
FIG. 7 illustrates exemplary results of experiments performed using embodiments of the present systems and methods.

These results show DoS2 and U-Net have far fewer false positives compared to Hessian, however, in this example, embodiments of the present systems and methods produce the fewest false positives while maintaining high sensitivity. The difference in false positive behavior between embodiments of the present systems and methods and U-Net is further emphasized in FIG. 7, where surface renderings are annotated in red to depict false positives. The only post-processing performed to generate the renderings was thresholding at the optimal PR-AUC thresholds. FIG. 7 shows Surface renderings of FissureNet (a, c, e) and U-Net (b, d, f) results for six COPDGene subjects (rows 1 and 2) and six lung cancer subjects (rows 3 and 4). True positives and false positives are depicted in gray and red, respectively. Probability output was thresholded at optimal threshold for each method as determined by PR curve.

DISCUSSION. Existing fissure detection methods are limited to handcrafted and local features. These features typically suffer from low specificity as it is difficult to differentiate fissures from the other structures in the lung without global context. Additionally, it is difficult to design features that are robust against all fissure variations, especially for global compared to local features. To overcome the challenge of designing robust and discriminative features a deep learning approach may be used to learn the feature detectors from labeled training cases. The main challenges associated with training a ConvNet to detect fissures in CT images are the size of the input images and the highly skewed class distributions.

The majority of ConvNets used in medical imaging applications use 2D image slices or use a sliding window approach with small image crops to overcome limitations in GPU memory. While this is a reasonable approach for some tasks, for fissure segmentation it is not desirable. The 3D appearance of a fissure is important to distinguish it from other structures that would otherwise appear similar on 2D slices. Global information provides additional context which is especially important when the fissure signal is weak, however, this information is not considered by patch-based approaches.

Compared to other segmentation architectures, Seg3DNet is an asymmetrical encoder-decoder network which uses less memory in order to accommodate a 3D network, larger input images, and more network levels. This allows for global information to be learned and results in higher specificity. By training separate Seg3DNets for the left and right lungs, the size of the input image may be reduced by a factor of two. This optimization does not degrade performance, as information from one lung does not provide global information for fissure detection in the other lung.

To handle the class imbalance, a coarse-to-fine ConvNet cascade may be: used the first ConvNet learns the fissure ROI and the second ConvNet learns the precise fissure location. In addition to mitigating the effect of class imbalance, the fissure ROI classifier is more sensitive to weak and incomplete fissures. Since the second training phase weights the voxel misclassification costs by the probability of being in the fissure ROI, the contribution of costs from the large number of non-fissure voxels is limited. Therefore, the class imbalance problem is mitigated while allowing for precise fissure prediction. In an embodiment, another approach would be to train a single network with two outputs: one for the fissure ROI and one for precise fissure prediction.

Fully-connected layers are not used in Seg3DNet, making it a fully-convolutional network (FCN). This greatly reduces the number of parameters and makes the network less prone to overfitting; for example, a proposed network has 3 million parameters compared to the popular VGG-16 network which has 138 million parameters. Furthermore, in an FCN the number of parameters is not dependent on the input image size, so the network can be trained and deployed on images of different sizes. In this example, the network was trained on fixed-size image crops of 64×200×200 due to limited GPU memory, however, in some cases the entire lung field does not fit in this crop. At test time there is more memory available as mini-batches are not used and gradients do not need to be stored for backpropagation. As a result, at test time much larger inputs may be used. In fact, the entire lung region, regardless of size, can be used as input and inference can be done in one forward pass per image. This is extremely efficient compared to patchwise approaches. In addition, Seg3DNet can accommodate different input image sizes, avoiding aggressive rescaling and interpolation that might degrade the fissure signal.

This example is the first study to evaluate a fissure detection method on a dataset of this size and diversity: 3706 COPDGene subjects with TLC and FRC scans and 20 lung cancer subjects with 4DCT scans. The COPDGene data used for training and evaluation came from 21 different institutions. Different scanner makes and models were used, as well as different reconstruction algorithms. In this example, the diversity of the evaluation set was further enriched with a lung cancer dataset of 4DCT scans. These scans were acquired at a lower dose during breathing, resulting in poorer image quality, motion blurring, and/or artifacts which were not present in the training dataset. Robustness to such diversity is generally a challenge when designing rule-based algorithms for image segmentation: it can be difficult to achieve similar performance across different scanning protocols and diseases.

In this example, fissure detection performance was evaluated on four methods: Hessian-based, DoS, a deep learning approach using the U-Net architecture, and embodiments of the present systems and methods. embodiments of the present systems and methods and U-Net both greatly outperformed the Hessian and DoS methods on all datasets. Hessian and DoS methods were not able to detect weak fissures and produced many false positives at blood vessels and diseased regions. embodiments of the present systems and methods consistently outperformed U-Net; while both methods demonstrated high sensitivity for fissure detection, embodiments of the present systems and methods predicted fewer false positives. This can be attributed to the larger input patches and coarse-to-fine cascade, allowing the network to use more global context to differentiate true fissures from disease that resembles fissures.

On the COPDGene evaluation dataset, all methods performed better on TLC scans compared to FRC scans in terms of PR-AUC. However, in the COPDGene trial the TLC scans were acquired at a higher dose and thus the image quality was better, so better performance was expected. In the future, comparing images of the lung at different inspiration levels acquired using the same dose would help determine which inspiration level is best for fissure detection. Although the performance on FRC images was worse, the embodiments of the present systems and methods results are nonetheless impressive for lower dose scans. This demonstrates the ability of embodiments of the present systems and methods to generalize across different scanning protocols. The COPDGene dataset consisted of subjects with a wide range of disease severity, encompassing all GOLD stages. It is more challenging to detect fissures in heavily diseased cases as alterations in the underlying tissue can resemble the fissure and/or result in abnormal tissue appearance. Performance of embodiments of the present systems and methods was robust to these challenges.

Training a multi-class network for the right lung results in the ability to distinguish between oblique and horizontal fissures. Embodiments of the present systems and methods may be the first fissure to make this distinction. Since the ultimate goal is to divide the lungs into lobes, unique predictions for different fissures facilitates straightforward post-processing. A limitation of training embodiments of the present systems and methods using a ground truth containing only oblique and horizontal fissures is an inability to detect accessory fissures. While accessory fissures have exhibit similar local appearance compared to the major fissures, the proposed embodiments of the present systems and methods learns high level information encoded in the particular shapes and orientations of the oblique and horizontal fissures. However, introducing an accessory fissure class and providing additional annotation in the training data could extend the network's capability.

Detection of the right horizontal fissure was consistently worse than the oblique fissures for the COPDGene dataset. The orientation of the horizontal fissure is often parallel with the axial imaging plane, potentially obscuring the fissure in CT images. It is not uncommon for horizontal fissures to be radiographically incomplete or missing, hindering identification even by human analysts. Interestingly, on the 4DCT dataset the ROF has a higher ASD compared to the RF.

The COPDGene ground truth fissures used for evaluation have several limitations. The fissures were automatically extracted from lobar segmentations resulting in complete fissure boundaries for all cases even those with radiographically incomplete or missing fissures. In such cases, the extrapolated or interpolated fissure location is highly subjective and evaluating the performance of any automated method using such a ground truth is limited in these regions. Furthermore, the ground truth fissures in the COPDGene evaluation dataset were generated using the same method as the training dataset (Apollo software followed by manual correction). This introduces a bias for learning-based methods to identify complete fissures in unseen subjects regardless of actual fissure integrity. An additional possible bias may be attributed to the embodiments of the present systems and methods and U-Net methods being trained on the COPDGene dataset, while the Hessian and DoS methods were developed on an independent dataset.

To address these limitations, evaluation was performed on a dataset of lung cancer subjects with 4DCT scans. The ground truth fissure segmentations for this dataset were generated manually. Additionally, both complete and visible-only fissures were annotated. All fissure detection methods performed worse on the 4DCT dataset compared to the COPDGene dataset. The 4DCT scans use a lower dose and commonly have motion artifacts and blurring, resulting in decreased fissure visibility. All methods performed better using the visible-only fissure ground truth.

In general, deep learning techniques require a large training dataset with ground truth segmentations. Manual segmentation is tedious, time-consuming, and typically performed by a medical imaging expert analyst. Additionally, a high-end GPU card may be required for training the network and such a card may not be available on a standard workstation. However, once the network is trained, it may be deployed on a low-end consumer GPU. Although there is a large overhead in training time (for example, 48 hours), processing time may be as little as, for example, 20 seconds per image. Networks trained on natural images that are transferred to medical images find that pretraining may result in improved or equal performance compared to random initialization. No transfer learning was used in this example due to limited availability of pretrained weights for 3D architectures.

Embodiments of the present systems and methods may be advantageously applied to fissure detection, but may not provide a complete lobar segmentation. However, the high specificity of embodiments may facilitate lobar segmentation with simple post-processing, such as thresholding, morphological operations, and connected component analysis. For challenging cases with incomplete fissures, a more sophisticated surface-fitting technique may be used for post-processing. For example, an optimal surface finding graph search may be used to divide the lung into lobes, defining the graph costs by fissure probabilities.

CONCLUSION. Embodiments of the present systems and methods may provide automatic detection of pulmonary fissures in CT images using a deep learning framework. Embodiments may utilize a coarse-to-fine cascade of ConvNets, which may be called FissureNet, and a novel 3D segmentation architecture, which may be called Seg3DNet. In exemplary experiments, fissure detection was evaluated with two rule-based methods (Hessian and DoS) and two learning-based methods (embodiments of the present systems and methods and U-Net). In this example, the learning-based methods outperformed the rule-based methods. Furthermore, embodiments of the present systems and methods outperformed U-Net as embodiments were capable of learning larger-scale global features. Embodiments of the present systems and methods may achieve high sensitivity for fissure detection while producing very few false positives, allowing for straightforward post-processing to obtain a final lobar segmentation. The results show that embodiments of the present systems and methods may be robust to different CT scanners, scanning protocols (low-dose and normal-dose), inspiration levels (TLC and FRC), imaging modalities (breath-hold vs. 4DCT), and severities of pulmonary disease.

An exemplary block diagram of a computer system 800, in which processes involved in the embodiments described herein may be implemented, is shown in FIG. 8. Computer system 800 may be implemented using one or more programmed general-purpose computer systems, such as embedded processors, systems on a chip, personal computers, workstations, server systems, and minicomputers or mainframe computers, or in distributed, networked computing environments. Computer system 800 may include one or more processors (CPUs) 802A-802N, input/output circuitry 804, network adapter 806, and memory 808. CPUs 802A-802N execute program instructions in order to carry out the functions of the present communications systems and methods. Typically, CPUs 802A-802N are one or more microprocessors, such as an INTEL CORE® processor. FIG. 8 illustrates an embodiment in which computer system 800 is implemented as a single multi-processor computer system, in which multiple processors 802A-802N share system resources, such as memory 808, input/output circuitry 804, and network adapter 806. However, the present communications systems and methods also include embodiments in which computer system 800 is implemented as a plurality of networked computer systems, which may be single-processor computer systems, multi-processor computer systems, or a mix thereof.

Input/output circuitry 804 provides the capability to input data to, or output data from, computer system 800. For example, input/output circuitry may include input devices, such as keyboards, mice, touchpads, trackballs, scanners, analog to digital converters, etc., output devices, such as video adapters, monitors, printers, etc., and input/output devices, such as, modems, etc. Network adapter 806 interfaces device 800 with a network 810. Network 810 may be any public or proprietary LAN or WAN, including, but not limited to the Internet.

Memory 808 stores program instructions that are executed by, and data that are used and processed by, CPU 802 to perform the functions of computer system 800. Memory 808 may include, for example, electronic memory devices, such as random-access memory (RAM), read-only memory (ROM), programmable read-only memory (PROM), electrically erasable programmable read-only memory (EEPROM), flash memory, etc., and electro-mechanical memory, such as magnetic disk drives, tape drives, optical disk drives, etc., which may use an integrated drive electronics (IDE) interface, or a variation or enhancement thereof, such as enhanced IDE (EIDE) or ultra-direct memory access (UDMA), or a small computer system interface (SCSI) based interface, or a variation or enhancement thereof, such as fast-SCSI, wide-SCSI, fast and wide-SCSI, etc., or Serial Advanced Technology Attachment (SATA), or a variation or enhancement thereof, or a fiber channel-arbitrated loop (FC-AL) interface.

The contents of memory 808 may vary depending upon the function that computer system 800 is programmed to perform. In the example shown in FIG. 8, exemplary memory contents are shown representing routines and data for embodiments of the processes described above. However, one of skill in the art would recognize that these routines, along with the memory contents related to those routines, may not be included on one system or device, but rather may be distributed among a plurality of systems or devices, based on well-known engineering considerations. The present communications systems and methods may include any and all such arrangements.

In the example shown in FIG. 8, memory 808 may include CT image data 812, left lung mask routines 814A, right lung mask routines 814B, Seg3DNet: left fissure ROI routines 816A, Seg3DNet: right fissure ROI routines 816B, output data $P_{LOR}$ 818AA, $P_{NR}$ 818AB, $P_{ROR}$ 818BA, $P_{RHR}$ 818BB, $P_{NR}$ 818BC, Seg3DNet: left fissure routines 820A, Seg3DNet: right fissure routines 820B, output data $P_{LOF}$ 822AA, $P_{NF}$ 822AB, $P_{ROF}$ 822BA, $P_{RHF}$ 822BB, $P_{NF}$ 822BC, and operating system 824. CT image data 812 may include data including one or more CT images of lungs or portions of lungs. Left and right lung mask routines 814A, 814B may include software routines to mask the CT images to either the left or right lung, respectively, for input to the respective left or right lung network. Seg3DNet: left fissure ROI routines 816A and Seg3DNet: right fissure ROI routines 816B may include software routines and data to accept a left or right lung masked CT image and generate probabilities that each voxel in the image is left oblique fissure ROI, $P_{LOR}$ 818AA, left non-fissure ROI, $P_{NR}$ 818AB, right oblique fissure ROI, $P_{ROR}$ 818BA, right horizontal fissure ROI, $P_{RHR}$ 818BB, or right non-fissure ROI, $P_{NR}$ 818BC. Seg3DNet: left fissure routines 820A, Seg3DNet: right fissure routines 820B may include software routines and data to accept a left or right lung masked CT image and the probabilities $P_{LOR}$ 818AA, $P_{NR}$ 818AB, $P_{ROR}$ 818BA, $P_{RHR}$ 818BB, $P_{NR}$ 818BC, and generate probabilities that each voxel in the image is left oblique fissure, $P_{LOF}$ 822AA, left non-fissure, $P_{NF}$ 822AB, right oblique fissure, $P_{ROF}$ 822BA, right horizontal fissure, $P_{RHF}$ 822BB, or right non-fissure, $P_{NF}$ 822BC. Operating system 824 may provide overall system functionality.

As shown in FIG. 8, the present communications systems and methods may include implementation on a system or systems that provide multi-processor, multi-tasking, multi-process, and/or multi-thread computing, as well as implementation on systems that provide only single processor, single thread computing. Multi-processor computing involves performing computing using more than one processor. Multi-tasking computing involves performing computing using more than one operating system task. A task is an operating system concept that refers to the combination of a program being executed and bookkeeping information used by the operating system. Whenever a program is executed, the operating system creates a new task for it. The task is like an envelope for the program in that it identifies the program with a task number and attaches other bookkeeping information to it. Many operating systems, including Linux, UNIX®, OS/2®, and Windows®, are capable of running many tasks at the same time and are called multi-tasking operating systems. Multi-tasking is the ability of an operating system to execute more than one executable at the same time. Each executable is running in its own address space, meaning that the executables have no way to share any of their memory. This has advantages, because it is impossible for any program to damage the execution of any of the other programs running on the system. However, the programs have no way to exchange any information except through the operating system (or by reading files stored on the file system). Multi-process computing is similar to multi-tasking computing, as the terms task and process are often used interchangeably, although some operating systems make a distinction between the two.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method comprising:
   imaging, using a computed tomography system, at least one lung, to generate, at a computer system comprising a processor, memory accessible by the processor, and computer program instructions stored in the memory and executable by the processor, at least one computed tomography image of the at least one lung, the at least one computed tomography image comprising a plurality of voxels;
   determining, at the computer system, using a first convolutional neural network, at least one fissure region of interest in the at least one lung image, wherein determining at least one fissure region of interest comprises:
     classifying, at the computer system, using the first convolutional neural network trained for a right lung, each of the plurality of voxels in a masked image of a right lung as being included in a right oblique fissure region of interest, being included in a right horizontal fissure region of interest, or being included in a non-fissure region of interest, the classification forming a coarse right lung probability map;
     classifying, at the computer system, using the first convolutional neural network trained for a left lung, each of the plurality of voxels in a masked image of a left lung as being included in a left oblique fissure region of interest or being included in a non-fissure region of interest, the classification forming a coarse left lung probability map, wherein a selected voxel, of the plurality of voxels, for training data for the first convolutional neural network is assigned to a fissure region of interest if the selected voxel is within 5 mm of a fissure;
   determining, at the computer system, using a second convolutional neural network, a more precise fissure location within the at least one fissure region of interest, wherein determining a more precise fissure location comprises:
     classifying, at the computer system, using the second convolutional neural network trained for a right lung, each of the plurality of voxels classified in the right oblique fissure region of interest as being included in the right oblique fissure or not being included in a fissure, and classifying, at the computer system, each of the plurality of voxels classified in the right horizontal fissure region of interest as being included in the right horizontal fissure or not being included in a fissure, the classification forming a precise right lung probability map; and classifying, at the computer system, using the second convolutional neural network trained for a left lung, each of the plurality of voxels classified in the left oblique fissure region of interest as being included in the left oblique fissure or not being included in a fissure, the classification forming a precise left lung probability map; and generating an image of the lung including indication of the determined fissure location.

2. The method of claim 1, further comprising:
masking, at the computer system, the image of the at least one lung based on whether the lung is a right lung or a left lung to generate a masked image of the lung.

3. The method of claim 1, wherein determining a more precise fissure location is performed using the second convolutional neural network trained to detect a more precise location within the fissure region of interest for a right lung and using the second convolutional neural network trained to detect a more precise location within the fissure region of interest for a left lung and wherein a total loss function for the second convolutional neural network comprises a weighted average using a probability that the selected voxel, of the plurality of voxels, is in a fissure region of interest.

4. The method of claim 1, further comprising determining fissure integrity based on at least one of the coarse right lung probability map, the coarse left lung probability map, the precise right lung probability map, and the precise left lung probability map.

5. A system comprising a processor, memory accessible by the processor, and computer program instructions stored in the memory and executable by the processor to perform:
imaging, using a computed tomography system, at least one lung, to generate at least one computed tomography image of the at least one lung, the at least one computed tomography image comprising a plurality of voxels;
determining, using a first convolutional neural network, at least one fissure region of interest in the at least one lung image, wherein determining at least one fissure region of interest comprises:
classifying using the first convolutional neural network trained for a right lung, each of the plurality of voxels in a masked image of a right lung as being included in a right oblique fissure region of interest, being included in a right horizontal fissure region of interest, or being included in a non-fissure region of interest, the classification forming a coarse right lung probability map;
classifying using the first convolutional neural network trained for a left lung, each of the plurality of voxels in a masked image of a left lung as being included in a left oblique fissure region of interest, or being included in a non-fissure region of interest, the classification forming a coarse left lung probability map, wherein a selected voxel, of the plurality of voxels, for training data for the first convolutional neural network is assigned to a fissure region of interest if the selected voxel is within 5 mm of a fissure;

determining using a second convolutional neural network, a more precise fissure location within the at least one fissure region of interest, wherein determining a more precise fissure location comprises:
classifying using the second convolutional neural network trained for a right lung, each of the plurality of voxels classified in the right oblique fissure region of interest as being included in the right oblique fissure or not being included in a fissure, and classifying, at the computer system, each of the plurality of voxels classified in the right horizontal fissure region of interest as being included in the right horizontal fissure or not being included in a fissure, the classification forming a precise right lung probability map; and
classifying using the second convolutional neural network trained for a left lung, each of the plurality of voxels classified in the left oblique fissure region of interest as being included in the left oblique fissure or not being included in a fissure, the classification forming a precise left lung probability map; and
generating an image of the lung including indication of the determined fissure location.

6. The system of claim 5, further comprising:
masking, the image of the at least one lung based on whether the lung is a right lung or a left lung to generate a masked image of the lung.

7. The system of claim 5, wherein determining a more precise fissure location is performed using the second convolutional neural network trained to detect a more precise location within the fissure region of interest for a right lung and using the second convolutional neural network trained to detect a more precise location within the fissure region of interest for a left lung and wherein a total loss function for the second convolutional neural network comprises a weighted average using a probability that the selected voxel, of the plurality of voxels, is in a fissure region of interest.

8. The system of claim 5, further comprising determining fissure integrity based on at least one of the coarse right lung probability map, the coarse left lung probability map, the precise right lung probability map, and the precise left lung probability map.

9. A computer program product comprising a non-transitory computer readable storage having program instructions embodied therewith, the program instructions executable by a computer system comprising a processor, memory accessible by the processor, and the program instructions stored in the memory and executable by the processor, to cause the computer to perform a method comprising:
imaging, using a computed tomography system, at least one lung, to generate, at a computer system, at least one computed tomography image of the at least one lung, the at least one computed tomography image comprising a plurality of voxels;
determining, at the computer system, using a first convolutional neural network, at least one fissure region of interest in the at least one lung image, wherein determining at least one fissure region of interest comprises:
classifying, at the computer system, using the first convolutional neural network trained for a right lung, each of the plurality of voxels in a masked image of a right lung as being included in a right oblique fissure region of interest, being included in a right horizontal fissure region of interest, or being included in a non-fissure region of interest, the classification forming a coarse right lung probability map;

classifying, at the computer system, using the first convolutional neural network trained for a left lung, each of the plurality of voxels in a masked image of a left lung as being included in a left oblique fissure region of interest, or being included in a non-fissure region of interest, the classification forming a coarse left lung probability map, wherein a selected voxel, of the plurality of voxels, for training data for the first convolutional neural network is assigned to a fissure region of interest if the selected voxel is within 5 mm of a fissure;

determining, at the computer system, using a second convolutional neural network, a more precise fissure location within the at least one fissure region of interest, wherein determining a more precise fissure location comprises:

classifying, at the computer system, using the second convolutional neural network trained for a right lung, each of the plurality of voxels classified in the right oblique fissure region of interest as being included in the right oblique fissure or not being included in a fissure, and classifying, at the computer system, each of the plurality of voxels classified in the right horizontal fissure region of interest as being included in the right horizontal fissure or not being included in a fissure, the classification forming a precise right lung probability map; and classifying, at the computer system, using the second convolutional neural network trained for a left lung, each of the plurality of voxels classified in the left oblique fissure region of interest as being included in the left oblique fissure or not being included in a fissure, the classification forming a precise left lung probability map; and generating an image of the lung including indication of the determined fissure location.

10. The computer program product of claim 9, further comprising:

masking, at the computer system, the image of the at least one lung based on whether the lung is a right lung or a left lung to generate a masked image of the lung.

11. The computer program product of claim 9, wherein determining a more precise fissure location is performed using the second convolutional neural network trained to detect a more precise location within the fissure region of interest for a right lung and using the second convolutional neural network trained to detect a more precise location within the fissure region of interest for a left lung and wherein a total loss function for the second convolutional neural network comprises a weighted average using a probability that the selected voxel, of the plurality of voxels, is in a fissure region of interest.

12. The computer program product of claim 9, further comprising determining fissure integrity based on at least one of the coarse right lung probability map, the coarse left lung probability map, the precise right lung probability map, and the precise left lung probability map.

\* \* \* \* \*